(12) United States Patent
Yoshimura (10) Patent No.: US 10,466,941 B2
(45) Date of Patent: Nov. 5, 2019

(54) PRINTING SERVICE SYSTEM AND PRINT TERMINAL WITH IMPROVED SECURITY

(71) Applicant: MITSUBISHI ELECTRIC CORPORATION, Tokyo (JP)

(72) Inventor: Tomoki Yoshimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/763,795

(22) PCT Filed: Apr. 28, 2016

(86) PCT No.: PCT/JP2016/063445
§ 371 (c)(1),
(2) Date: Mar. 27, 2018

(87) PCT Pub. No.: WO2017/110110
PCT Pub. Date: Jun. 29, 2017

(65) Prior Publication Data
US 2018/0285037 A1    Oct. 4, 2018

(30) Foreign Application Priority Data
Dec. 24, 2015  (JP) ................................ 2015-251033

(51) Int. Cl.
*G06F 3/12*  (2006.01)
*B41J 29/38*  (2006.01)
(Continued)

(52) U.S. Cl.
CPC ............ *G06F 3/1217* (2013.01); *B41J 29/38* (2013.01); *G06F 3/1204* (2013.01);
(Continued)

(58) Field of Classification Search
CPC .... G06F 3/1217; G06F 3/1204; G06F 3/1208; G06F 3/122; G06F 3/1222; G06F 3/1224;
(Continued)

(56) References Cited

U.S. PATENT DOCUMENTS

| 2004/0107257 | A1* | 6/2004 | Inoue | H04N 1/00212 |
| | | | | 709/206 |
| 2006/0255120 | A1* | 11/2006 | Schulz | G06Q 10/06 |
| | | | | 235/376 |
| 2015/0039616 | A1* | 2/2015 | Rolston | G06F 17/3028 |
| | | | | 707/737 |

FOREIGN PATENT DOCUMENTS

| JP | 2004-178392 A | 6/2004 |
| JP | 2005-107947 A | 4/2005 |

(Continued)

*Primary Examiner* — Iriana Cruz
(74) *Attorney, Agent, or Firm* — Birch, Stewart, Kolasch & Birch, LLP (57) ABSTRACT

The invention includes a print terminal that prints input image data and outputs the input image data as a print image, and an image storage server that is connected to the print terminal via a public network, and that stores the image data sent from the print terminal and user identification information. The print terminal creates, out of the print image, user identification information based on photographing location information and photographing date/time information included as data in a user identification information image specified by the user. In a case where the print terminal receives a re-input of image data of the user identification information image, the print terminal resends user identification information to the image storage server. In a case where an image directory including the resent user identification information internally exists, the image storage server sends the image data in the image directory to the print terminal.

3 Claims, 5 Drawing Sheets

(51) Int. Cl.
- *G06F 17/30* (2006.01)
- *G06F 16/58* (2019.01)
- *H04N 1/00* (2006.01)
- *H04N 1/32* (2006.01)
- *H04N 1/34* (2006.01)
- *H04N 1/44* (2006.01)

(52) U.S. Cl.
CPC .......... *G06F 3/1208* (2013.01); *G06F 3/1222* (2013.01); *G06F 3/1224* (2013.01); *G06F 3/1238* (2013.01); *G06F 3/1267* (2013.01); *G06F 3/1287* (2013.01); *G06F 16/5866* (2019.01); *H04N 1/0014* (2013.01); *H04N 1/00137* (2013.01); *H04N 1/00145* (2013.01); *H04N 1/00151* (2013.01); *H04N 1/00169* (2013.01); *H04N 1/00188* (2013.01); *H04N 1/00244* (2013.01); *H04N 1/32128* (2013.01); *H04N 1/34* (2013.01); *H04N 1/4406* (2013.01); *G06F 3/122* (2013.01); *H04N 2201/0039* (2013.01); *H04N 2201/3205* (2013.01); *H04N 2201/325* (2013.01); *H04N 2201/3214* (2013.01); *H04N 2201/3215* (2013.01); *H04N 2201/3252* (2013.01); *H04N 2201/3253* (2013.01); *H04N 2201/3254* (2013.01); *Y02P 90/30* (2015.11)

(58) Field of Classification Search
CPC ............. G06F 3/1238; G06F 17/30268; G06F 3/1287; B41J 29/38
See application file for complete search history.

(56) References Cited

FOREIGN PATENT DOCUMENTS

| | | |
|---|---|---|
| JP | 2012-179877 A | 9/2012 |
| JP | 2013-146915 A | 8/2013 |

\* cited by examiner

PRINTING SERVICE SYSTEM AND PRINT TERMINAL WITH IMPROVED SECURITY

TECHNICAL FIELD

The present invention relates to a printing service system, and more particularly, to a printing service system for printing an image stored in an image storage server via an information network using a print terminal.

BACKGROUND ART

As a related-art printing service system, for example, as disclosed in Patent Documents 1 to 3, there is given a system for printing an image loaded from an image storage server or a card medium.

In a printing service system of Patent Document 1, at the time of printing an image stored in a server using a print terminal, a user inputs an ID code and a password assigned to each user through a touch panel equipped in the print terminal or the like, thereby being capable of reading out an image stored in the server to be printed.

Further, Patent Document 2 discloses a technology in which, at the time of printing an image stored in a server using a print terminal, image identification information printed on the back of a printed material that is previously printed is read by an image identification information reading device, and an image associated with the image identification information is downloaded from a server to be printed.

Further, Patent Document 3 mentioned above discloses a technology in which, at the time of printing an image stored in a server using a print terminal, image identification information delivered via electronic mail is read by an identification information acquisition part, and an image associated with the image identification information is downloaded from a server to be printed.

PRIOR ART DOCUMENTS

Patent Documents

Patent Document 1: Japanese Patent Application Laid-Open No. 2004-178392
Patent Document 2: Japanese Patent Application Laid-Open No. 2012-179877
Patent Document 3: Japanese Patent Application Laid-Open No. 2013-146915

SUMMARY

Problem to be Solved by the Invention

In the print terminal disclosed in Patent Document 2, an input of an ID code and a password as in the print terminal in the printing service system disclosed in Patent Document 1 is unnecessary, and hence reduction of time until printing and prevention of an erroneous input of an ID code and a password can be realized and management of an ID code for each image can be realized; however, on the other hand, image identification information needed to be printed on a back surface of a printed material, which required equipment of a back surface printer, or different back surface printing means.

Further, a print terminal without an image identification information reading device needs to be equipped with an image identification information reading device as well, which may be a cause of increase in cost. Further, a printed material being previously printed was required to be brought to the print terminal and to make the print terminal read the image identification information, which might soil or damage the printed material on each of such occasions.

Further, the print terminal disclosed in Patent Document 3 requires an identification information acquisition part and an email delivery part, and hence a device having such functions needs to be added, which may be a cause of increase in cost. Further, the service was unavailable without possession of a mobile phone.

The present invention has been made in order to solve the problems as described above, and has an object to provide a printing service system in which operations performed until an image stored in an image storage server is printed in a print terminal are simplified.

Means to Solve the Problem

A printing service system according to the present invention includes a print terminal that prints input image data and outputs the input image data as a print image, and an image storage server that is connected to the print terminal via a public network, and that stores the image data sent from the print terminal via the public network and user identification information for identifying a user of the print terminal. The print terminal acquires, out of the print image, photographing location information and photographing date/time information included as data in a user identification information image specified by the user, and creates the user identification information based on the acquired photographing location information and photographing date/time information. The image storage server associates the image data sent from the print terminal with the user identification information, and creates an image directory for each of the user to store the image data sent from the print terminal and the user identification information. In a case where the print terminal receives a re-input of image data of the user identification information image, the print terminal resends the user identification information to the image storage server. The image storage server receives resending of the user identification information, and in a case where an image directory including the resent user identification information internally exists, sends the image data in the image directory to the print terminal.

Effects of the Invention

According to the present invention, it is possible to simplify operations performed until an image stored in an image storage server is printed in a print terminal.

DESCRIPTION OF EMBODIMENT

<First Embodiment>
<Device Configuration>

Figure 1:
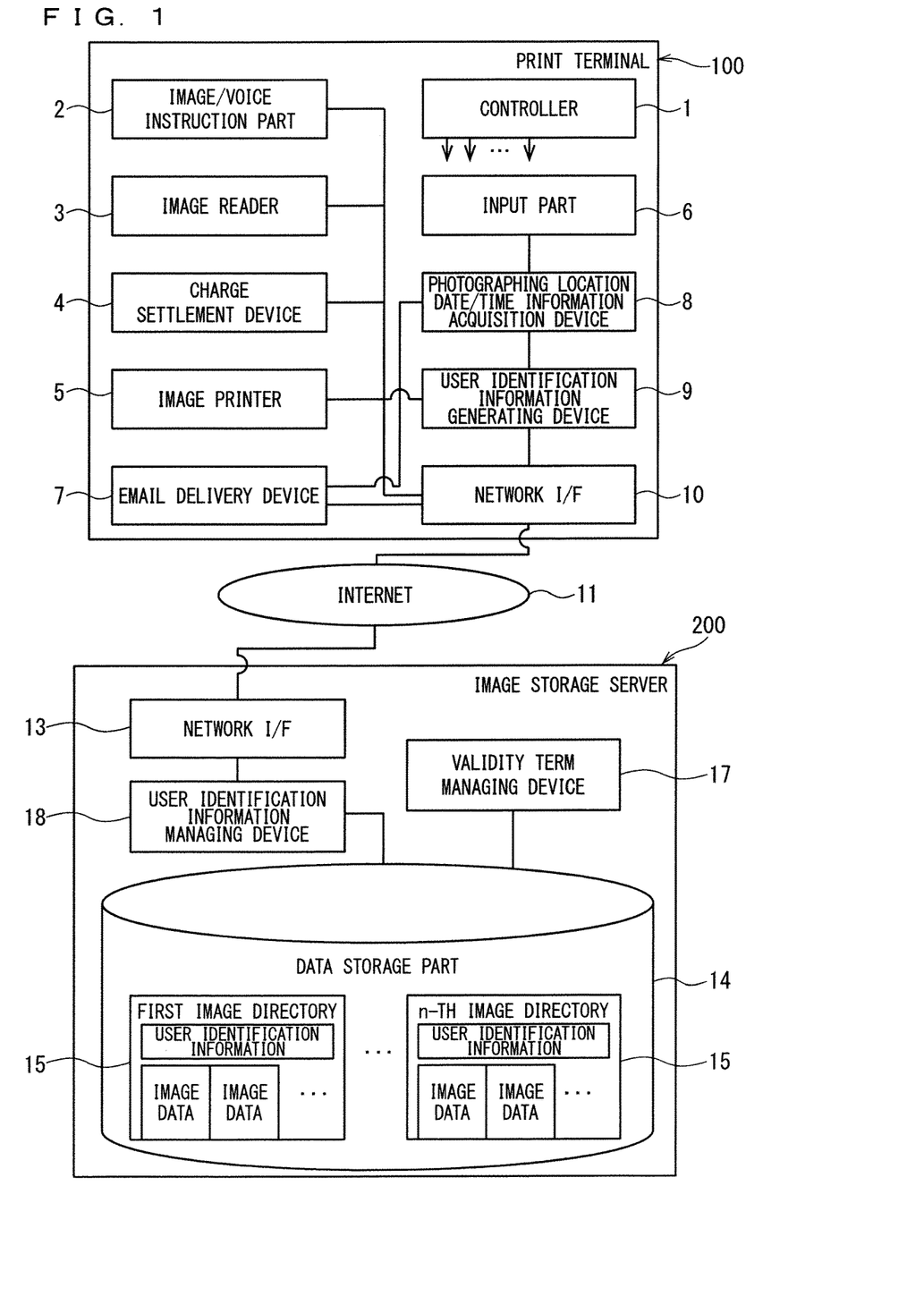
FIG. 1 is a block diagram illustrating a configuration of a printing service system according to the present invention.

A configuration of a printing service system according to the present invention is described using a block diagram illustrated in FIG. 1. As illustrated in FIG. 1, the printing service system according to the present invention includes a print terminal 100 and an image storage server 200, and has a configuration in which both are connected to a public network such as internet 11. Note that, in the following description, a user is defined as a user of the printing service system and an owner of image data of an image that is desired to be printed.

As illustrated in FIG. 1, the print terminal 100 includes a controller 1, an image/voice instruction part 2, an image reader 3, a charge settlement device 4, an image printer 5, an input part 6, an email delivery device 7, a photographing location date/time information acquisition device 8, a user identification information generating device 9, and a network interface (I/F) 10.

The controller 1 is connected to each of the above-mentioned components of the print terminal 100 (not shown), and has hardware and software for managing conditions of each component and performing control of each component.

The image/voice instruction part 2 includes an image display portion (display) formed of a liquid crystal monitor, a cathode-ray tube (CRT), or the like, and a voice instruction part formed of a speaker or the like, and is a section that instructs a user with operations.

The image reader 3 is a section that reads image data input via a reader/writer (not shown) of a medium card such as a CompactFlash (registered trademark) card storing an image desired to be printed by the user (print image), image data downloaded from the image storage server 200 via the network I/F 10, or image data recorded in a mobile phone via wireless communication such as WiFi (registered trademark) and a cable for mobile phone data communication.

The charge settlement device 4 is a device for settling charge used by the user, the image printer 5 is a device that prints an image specified by the user among images read by the image reader 3, and the input part 6 includes an input display attached with a touch panel for the user to perform selection of the menu, specification of the number of copies to be printed and an image, and the like, a keyboard, a mouse, and the like.

The photographing location date/time information acquisition device 8 is a device that acquires, concerning the image data read by the image reader 3, photographing location information and photographing date/time information out of additional information included in an image file format such as EXIF, and the user identification information generating device 9 is a device that generates user identification information using the photographing location information and the photographing date/time information that are acquired in the photographing location date/time information acquisition device 8.

The network I/F 10 is a section that enables connection to the internet 11 in a case of uploading image data to the image storage server 200 from the print terminal 100 and in a case of downloading image data stored in the image storage server 200 to the print terminal 100.

Further, as illustrated in FIG. 1, the image storage server 200 includes a network I/F 13 that enables connection to the internet 11 in a case of communicating to/from the print terminal 100 via the internet 11, a data storage part 14 that associates image data uploaded by the user with user identification information to be stored for each of directories, a validity term managing device 17 that manages a validity term of an image directory in the data storage part 14, and a user identification information managing device 18 that performs extraction, management, and the like of image data and user identification information that are stored in the data storage part 14.

<Operations>

Figure 2:
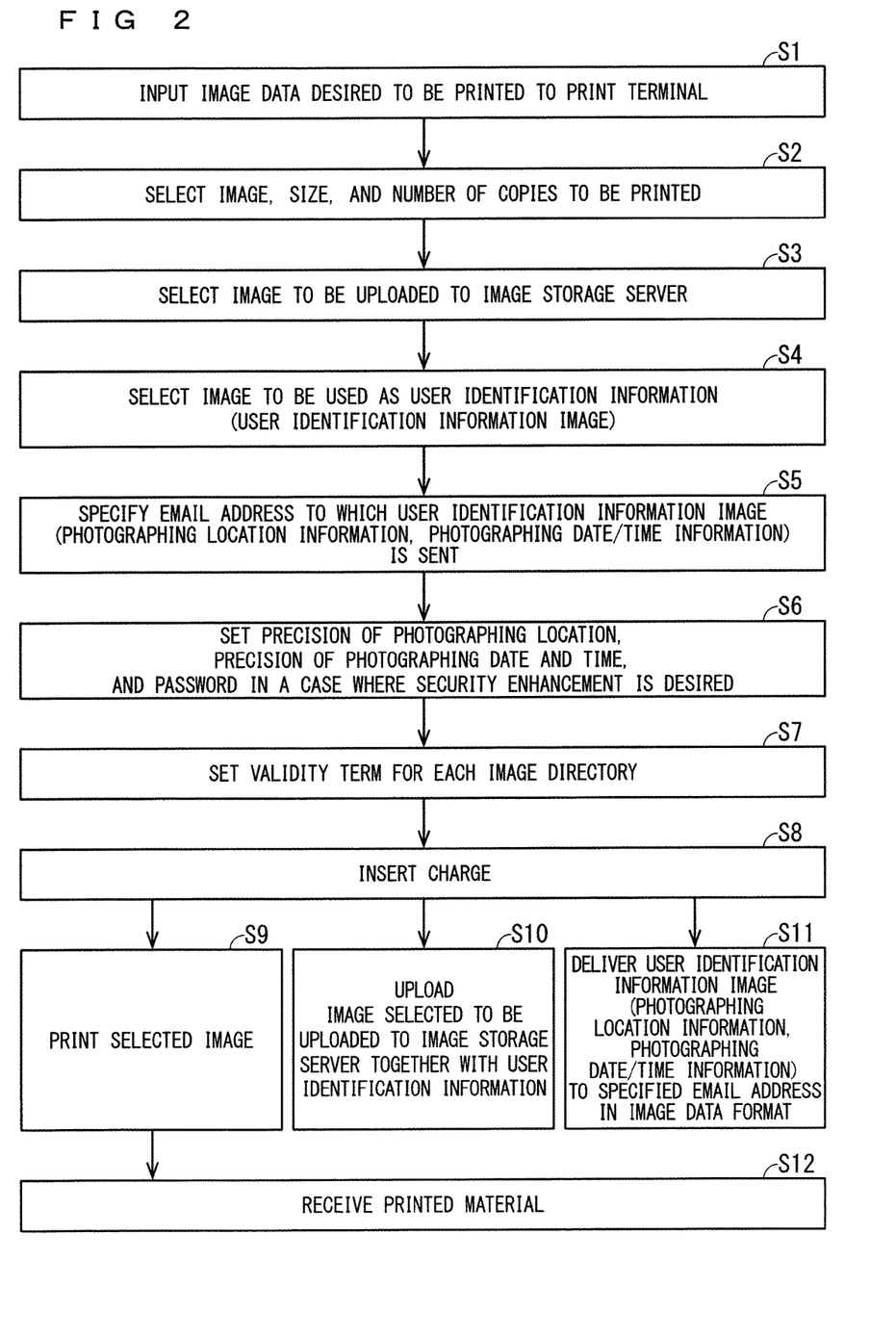
FIG. 2 is a flowchart illustrating user operations for a print terminal of the printing service system according to the present invention.
Figure 3:
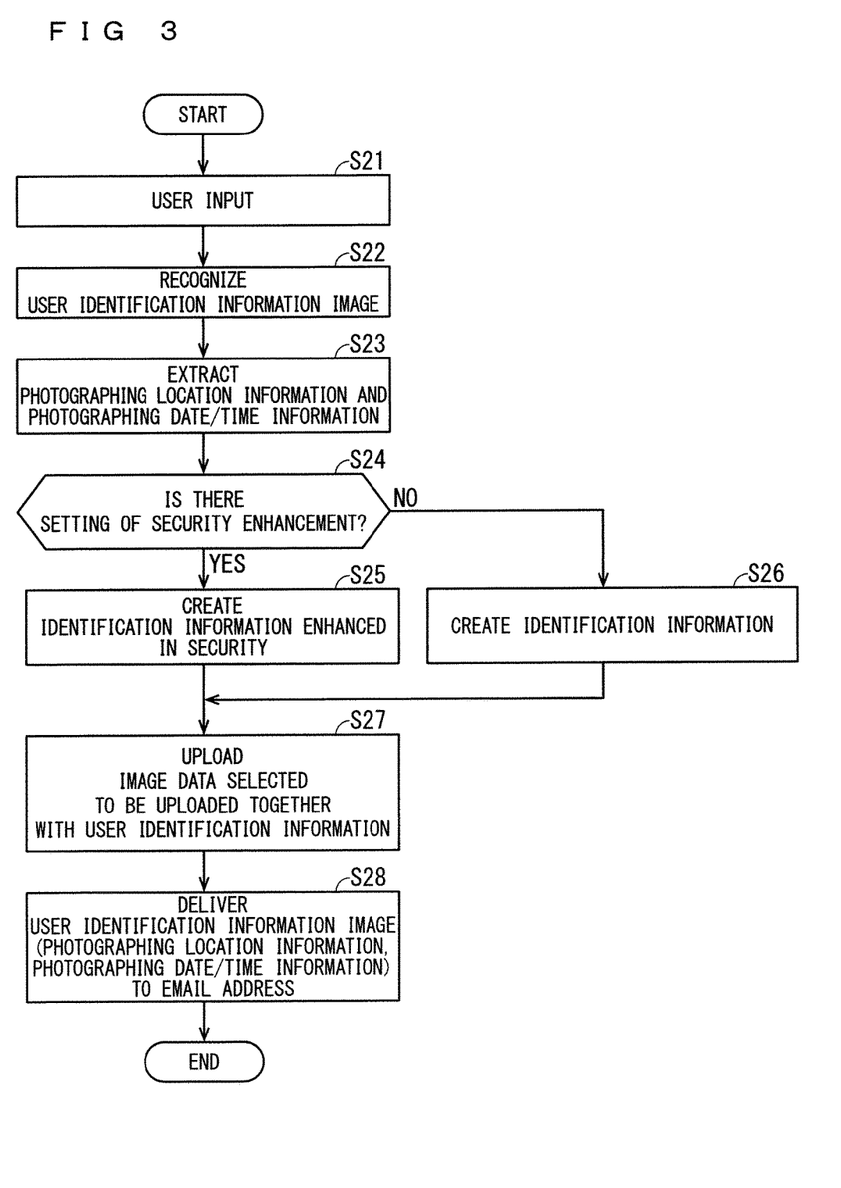
FIG. 3 is a flowchart illustrating a process for generating user identification information in the print terminal of the printing service system according to the present invention.

Next, operations of the printing service system of a first embodiment are described using FIG. 2 and FIG. 3. FIG. 2 is a flowchart illustrating user operations for the print terminal 100.

The user using the print terminal 100 follows instructions such as display and a voice guide of the input display of the print terminal 100 to input, to the print terminal 100, image data of an image desired to be printed from a mobile phone, a compact disc (CD), a digital versatile disc (DVD), a card medium, and the like (Step S1). Image data of the image desired to be printed is stored in the mobile phone, the CD, the DVD, the card medium, and the like.

Next, the user follows instructions of the print terminal 100 to select an image to be printed and to select on which print medium the selected image is to be printed, and sets the sheet size and the number of copies to be printed (Step S2). Here, as the print media to be selected, sheets such as plain paper, plain paper with a protective layer, and seal paper may be selected, and further, as the sheet sizes, sizes such as a post card size (post size), an L size, and a 2L size may be selected. Further, in a case where the print terminal 100 adopts a plurality of printing modes, for example, printing modes may be selected among a dye-sublimation printer, an inkjet-type printer, and the like.

Next, the user follows instructions of the print terminal 100 to select, among the images selected in Step S2, an image to be stored (uploaded) in the image storage server 200 (Step S3). Uploading image data to the image storage server 200 enables image printing using the print terminal 100 without carrying a CD, a DVD, or the like. Note that, such selection is also possible as to upload not only images selected to be printed but unselected images as well.

Next, at the time of storing an image in the image storage server 200, the user selects one image (user identification information image) to be used as user identification information for security (Step S4). The user identification information image needs to have information for generating user identification information, and such information is described later.

Next, the user follows instructions of the print terminal 100 to specify an email address at the time of sending image data of the user identification information image via electronic mail to the user (Step S5) as a memorandum in case the user forgets the user identification information image. The user identification information image is selected in Step S4 by the user.

Here, the user identification information is described. An image photographed with a digital camera or the like is converted into a general image format such as JPEG and TIFF to be recorded. In image data recorded as JPEG or TIFF, additional information data defined by a standard such as an exchangeable image file format (EXIF) is recorded at the same time. Note that, EXIF is a registered trademark.

Information recorded in EXIF includes information related to photographing such as a photographing date and time, a name of a manufacturer of a photographing device, resolution of an image, a photographing orientation, a shutter speed, an f-stop value, an ISO speed value, photographing with or without firing flash, a focal distance, photographing location information (longitude, latitude, and altitude), and a thumbnail image.

Among above, in the present invention, photographing location information and photographing date/time information are mainly used to generate user identification information, and as a memorandum, image data of a user identification information image including photographing location information and photographing date/time information is sent to the email address specified in Step S5. For this reason, even in a case where the user forgets the user identification information image, the uploaded image can be printed again.

In a case where the user desires to further enhance security, following instructions of the print terminal 100, setting of precision of photographing location information, setting of precision of photographing date/time information, and setting of a password are possible (Step S6). Here, as a method of setting precision of photographing location information, setting of precision of longitude and latitude is conceivable. Note that, lower precision of photographing location information and photographing date/time information leads to lower security, and higher precision leads to higher security.

Next, the user follows instructions of the print terminal 100 to set a validity term of image data to be uploaded to the image storage server 200 (Step S7). The validity term means a term for storing image data to be uploaded in the image storage server 200, which is set, assuming that the image data may leak out of the image storage server 200, with the intention of avoiding storage in the image storage server for a time period more than necessary. Further, there is also intention of preventing increase in capacity of the server due to storage of the same image data in the image storage server 200 for a long time period. Note that, a set validity term is recorded in the image storage server 200 for each image directory.

Next, the user follows instructions of the print terminal 100 to insert a charge (Step S8). The charge to be inserted herein is a charge for printing an image and a charge for uploading an image to the image storage server 200. Necessary charge is calculated in the controller 1 (FIG. 1), and the charge is paid via the charge settlement device 4 (FIG. 1). As the charge settlement device 4, a charging device of a cash insertion type including a coin assorting machine such as a coin mechanism and a bill distinguishing machine such as a bill validator (registered trademark) may be used, or a device adaptable to electronic money such as Edy (registered trademark) may be used.

After the charge is paid, the print terminal 100 starts printing an image to be printed, which is selected in Step S2 (Step S9), and at the same time, image data of an image selected to be stored (selected to be uploaded) in the image storage server 200 in Step S3 is uploaded to the image storage server 200 together with image identification information (Step S10). Further, an image file name of the user identification information image selected in Step S4, photographing location information, and photographing date/time information are delivered via the email delivery device 7 (FIG. 1) to the email address specified in Step S5 in an image data format (Step S11).

The user receives a printed material of the image printed in Step S9 from the print terminal 100 (Step S12), thereby completing the printing service.

FIG. 3 is a flowchart illustrating, in the print terminal 100, a process for generating user identification information by extracting photographing location information and photographing date/time information from among the EXIF information pieces included in the user identification information image. Now, referring to FIG. 1, generation of user identification information in the print terminal 100 is described using FIG. 3.

In FIG. 3, when a user input, such as an input of image data, selection of an image to be printed, selection of a print medium, selection of a sheet size, and selection of the number of copies to be printed via the input part 6 (operations of Steps S1 to S3 of FIG. 2), is performed by the user, the controller 1 recognizes such user input (Step S21). Subsequently, when the controller 1 recognizes the user identification information image (Step S22) through selection of a user identification information image performed by the user (operation of Step S4 of FIG. 2), the controller 1 controls the photographing location date/time information acquisition device 8 to extract photographing location information and photographing date/time information from image data of the user identification information image (Step S23). Here, an example of the photographing location information and the photographing date/time information is shown in the table below.

TABLE 1

| Information Type | Information Content | Data |
|---|---|---|
| Photographing Location Information | 35° 38' 05.1234" N | 03538051234 (11 digits) |
| | 139° 52' 45.4321" E | 13952454321 (11 digits) |
| Photographing Date/Time Information | 2015 Aug. 14, 16:30 | 201508141630 (12 digits) |

As shown in Table 1 above, the information pieces of the longitude (east longitude) and the latitude (north latitude) extracted from the image data as photographing location information are given to the user identification information generating device 9 to be converted into 11-digit numbers, respectively, thus being made into data. Further, a photographing date and time (including the unit of minute) extracted as photographing date/time information is given to the user identification information generating device 9 to be converted into a 12-digit number, thus being made into data.

Further, in the user identification information generating device 9, data of longitude, latitude, and date and time are, for example, joined together so as to be lined in the order of latitude, longitude, and date and time from the former digits, thereby completing creating identification information. User identification information created in this manner is shown as identification information 1 in the table below.

TABLE 2

| Identification Information 1 | 035380512341395245432120150814163 |
|---|---|

As shown in Table 2 above, the identification information 1 is 34-digit user identification information obtained by combining latitude, longitude, the date and time, and thus it can be said that strength degree of security is considerably high; however, in a case where the controller 1 recognizes setting of security enhancement via the input part 6 that is performed by the user (operation of Step S6 of FIG. 2) (Step S24), the controller 1 controls the user identification information generating device 9 to create identification information having further enhanced security (Step S25).

For enhancement of security, precision of photographing location information, precision of photographing date/time information, and a password that are set by the user via the input part 6 may be used. For example, 4-digit password information set by the user may be added to the identification information 1. User identification information created in this manner is shown as identification information 2 in the table below.

TABLE 3

| Identification Information 2 | 03538051234139524543212015108146305678 |
|---|---|

As shown in Table 3 above, the identification information 2 is 38-digit identification information obtained by adding 4-digit password information "5678" set by the user to the end of the identification information 1, and thus security can be further enhanced. Note that, when the identification information 2 is encrypted using encryption software or the like so as to be complicated, further enhancement may be realized.

Further, in the table above, as an example of security enhancement, a configuration in which 4-digit password information set by the user is added to the identification information 1 is shown; however, as described above, security may be enhanced using precision of photographing location information and precision of photographing date/time information that are set by the user via the input part 6. In the table below, an example of precision of photographing location information and precision of photographing date/time information is shown.

TABLE 4

| Information Type | Information Content |
|---|---|
| Photographing Location Information | 35° 38' 05.1234" N ± 0.0001" |
|  | 139° 52' 45.4321" E ± 0.0001" |
| Photographing Date/Time Information | 2015 Aug. 14, 16:30 ± 00:01 |

As shown in Table 4 above, precision of latitude information is set ±0.0001", thus joining "0001" to follow the latitude information of the identification information 1, further, precision of longitude information is set ±0.0001", thus joining "0001" to follow the longitude information of the identification information 1, and yet further, precision of photographing date/time information is set ±00:01, thus joining "1" to follow the date/time information of the identification information 1, and a total of 43-digit user identification information is thereby obtained. In this manner, when precision of photographing location information and precision of photographing date/time information are enhanced, security strength can be enhanced dramatically. Note that, both of precision of the photographing location information and precision of the photographing date/time information may be set, but only either one thereof may be set.

On the other hand, when precision of photographing location information and precision of photographing date/time information are set to be low, security strength can be reduced. In the table below, an example of reducing security strength by setting precision of photographing location information and precision of photographing date/time information to be low is shown.

TABLE 5

| Information Type | Information Content |
|---|---|
| Photographing Location Information | 35° 38' 05.1234" N ± 1' |
|  | 139° 52' 45.4321" E ± 1' |
| Photographing Date/Time Information | 2015 Aug. 14, 16:30 ± 01:00 |

As shown in Table 5 above, precision of latitude information is set ±1' thus joining "1" to follow the latitude information of the identification information 1, further, precision of longitude information is set ±1', thus joining "1" to follow the longitude information of the identification information 1, and yet further, precision of photographing date/time information is set ±01:00, thus joining "1" to follow the date/time information of the identification information 1, and a total of 37-digit user identification information is thereby obtained. In this manner, when precision of photographing location information and precision of photographing date/time information are set to be low, security strength can be reduced. However, in comparison with security strength of the 34-digit user identification information obtained in a case where precision of photographing location information and precision of photographing date/time information are not set, 37-digit user identification information is obtained even in a case where the above-mentioned precisions are reduced, and hence security strength is high. In this manner, when precision is set in each information piece, the effect of attaining variations in adjustment of security strength of user identification information is obtained. Note that, both of precision of the photographing location information and precision of the photographing date/time information may be set, but only either one thereof may be set.

Further, in the identification information 2 shown in Table 3, a configuration of enhancing security by adding 4-digit password information is shown. However, further security enhancement is possible by further adding precision of photographing location information and precision of photographing date/time information to the identification information 2.

Here, returning to the description of the flowchart of FIG. 3, in a case where the user does not desire to enhance security, that is, in a case where the controller 1 does not recognize setting of security enhancement by the user via the input part 6, the identification information 2 is not created in the user identification information generating device 9, and the identification information 1 is used as user identification information (Step S26).

Note that, for enhancing specificity of identification information, it suffices to select, at the time of selecting a user identification information image (operation of Step S4 of FIG. 2), not an image photographed at a public place but an image photographed at a place where only a particular person can enter. As an example of an optimal place, a home of the photographer is given. Depending on precision of GPS, a GPS camera having precision for several centimeters to several tens of centimeters can specify location of the home of the photographer, and hence an image photographed at a home of the user at a specific date and time is not an image that can be photographed by an outsider but is an image that is photographed by the user him/herself, or his/her family member or a housemate, thus eliminating a possibility that the same identification information is created by accident to enable enhancement of specificity of identification information.

User identification information obtained through Step S25 or Step S26 is uploaded, together with the image data selected in Step S3 of FIG. 2, to the image storage server 200 via the network I/F 10 by the control of the controller 1 (Step S27). This corresponds to a process of Step S10 of FIG. 2.

Further, an image file name of the user identification information image selected in Step S4 of FIG. 2, photographing location information, and photographing date/time information are delivered as image data of the user identification information image to the email address specified in Step S5 of FIG. 2 via the email delivery device 7 by the control of the controller 1 (Step S28). This corresponds to a process of Step S11 of FIG. 2.

Figure 4:
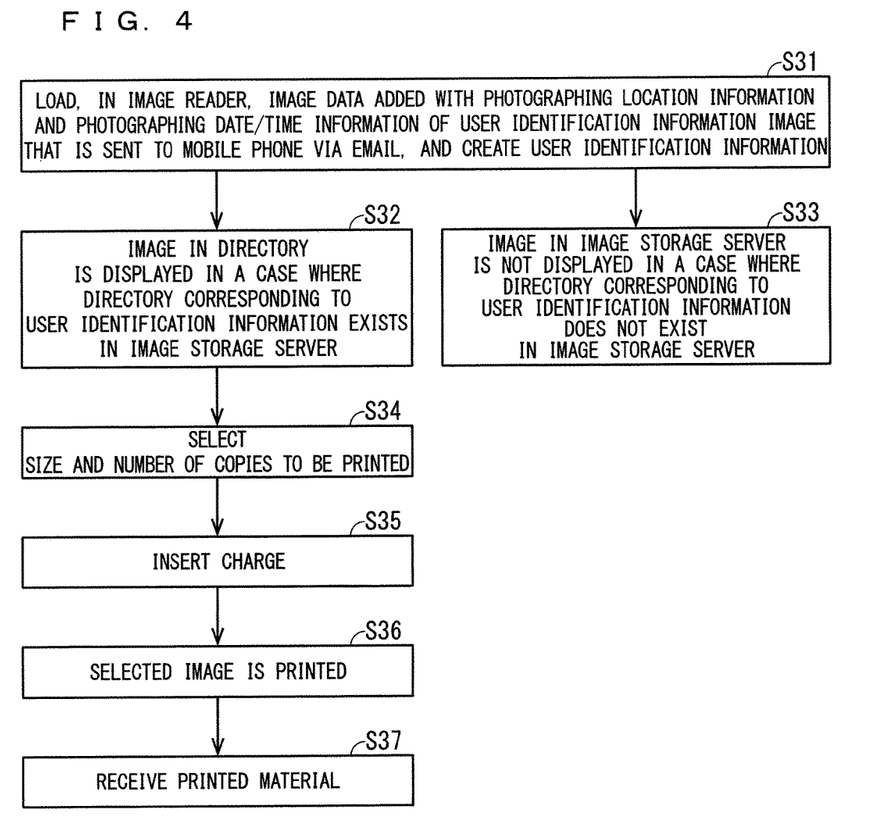
FIG. 4 is a flowchart illustrating a flow until an image of image data uploaded to an image storage server of the printing service system is printed according to the present invention.

Next, using a flowchart illustrated in FIG. 4, a flow until an image of the image data uploaded to the image storage server 200 is printed is described.

The user who desires to print an image of image data uploaded to the image storage server 200 receives a sent email of image data of a user identification information image to be used as user identification information, connects a mobile phone storing the image data to a connection terminal of the print terminal 100, follows instructions from the image/voice instruction part 2 of the print terminal 100 to specify the user identification information image, and inputs the image data again to load the image data in the image reader 3 (Step S31). Note that, in a case where the user does not forget the user identification information image and can identify, in Step S1 described using FIG. 2, the user identification information image from among images input as image data of the images desired to be printed to the print terminal 100, the image data sent to the mobile phone need not be used. That is, in a case where image data is input via CD, DVD, a card medium, or the like, without possession of a mobile phone, an image of the image data uploaded to the image storage server 200 can be printed by adopting this method.

In the image reader 3, precision of photographing location information and photographing date/time information are extracted from image data of the loaded user identification information image to be input to the user identification information generating device 9. The user identification information generating device 9 uses the input photographing location information and photographing date/time information to generate user identification information (Step S31).

The generated user identification information is resent to the image storage server 200 through the internet 11 via the network I/F 10 to be input again to the user identification information managing device 18 via the network I/F 13.

The user identification information managing device 18 searches image directories in the data storage part 14 based on the resent user identification information from the print terminal 100 to confirm whether or not an image directory including user identification information that matches with the resent user identification information exists.

In a case where a relevant image directory exists, the user identification information managing device 18 reads out image data of the relevant image directory to send the image data to the print terminal 100 through the internet 11 via the network I/F 13. In the print terminal 100, the image data is received via the network I/F 10 to display the image data in a display screen (which may be the same as the input display) of the image/voice instruction part 2 (Step S32).

Note that, in a case where the relevant image directory does not exist, the user identification information managing device 18 sends the purport thereof (download disapproval) to the print terminal 100 and does not send image data, and hence image data is not displayed in the print terminal 100, and the content of absence of the image data is displayed on the display screen of the image/voice instruction part 2 (Step S33).

In a case where a downloaded image is displayed in the display screen of the image/voice instruction part 2 of the print terminal 100, the user follows instructions such as display and a voice guide of the input display to select an image desired to be printed, the printing size, and the number of copies (Step S34) and to insert charge in Step S35, thereby starting printing of the selected image (Step S36). The user receives a printed material having a printed image from the print terminal 100 (Step S37), thereby completing the printing service.

Figure 5:
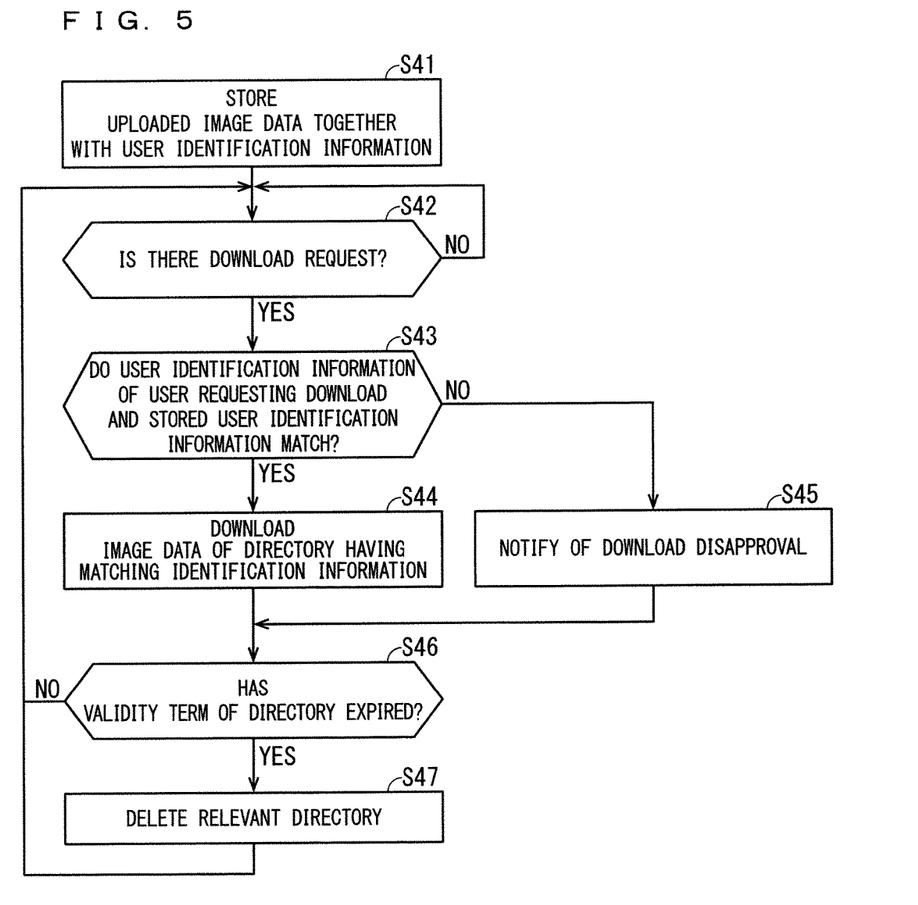
FIG. 5 is a flowchart illustrating operations of the image storage server of the printing service system according to the present invention.

Next, operations of the image storage server 200 are described using a flowchart illustrated in FIG. 5. When the image storage server 200 receives image data and user identification information of an image uploaded and sent from the print terminal 100 through the internet 11 via the network I/F 13, the image storage server 200 reads user identification information in the user identification information managing device 18, and associates the image data with the user identification information to store the image data and the user identification information in an image directory in the data storage part 14 (Step S41).

Note that, FIG. 1 illustrates a configuration in which the data storage part 14 has an n number of image directories 15 as first to n-th image directories, and each of the image directories 15 owns an address corresponding to user identification information together with image data. Further, in a case where precision of photographing location information, precision of photographing date/time information, and a password are set in the print terminal 100, those information pieces are also owned, and further, information of the validity term of the image directory set in the print terminal 100 is also owned.

After storing image data of an image uploaded and sent from the print terminal 100 and user identification information in the data storage part 14, the image storage server 200 waits for a download request from the print terminal 100 (Step S42). Note that, in a case where there is upload sending from the print terminal 100 while waiting for a download request, the upload sending is responded at any time.

In a case where a download request, that is, for example, an order to "download all images in a directory having the same user identification information," arrives from the print terminal 100 through the internet 11, the user identification information managing device 18 confirms matching between user identification information of the user requesting the download and user identification information in image directories in the data storage part 14 for each image directory (Step S43), and when there is a matching image directory, downloads to send the image data in the image directory via the print terminal 1 via the network I/F 13 (Step S44). Note that, it is also possible to download not all of the images but a part of the images in a directory having the same user identification information.

On the other hand, in Step S43, in a case where it is confirmed that there is no image directories that match with user identification information, the print terminal 100 is notified of download disapproval via the network I/F 13 (Step S45).

Further, the validity term managing device 17 in the image storage server 200 monitors a validity term of image directories in the data storage part 14 (Step S46), and deletes an image directory owning user identification information having an expired validity term from the inside of the data storage part 14 (Step S47). Then, after confirming the validity term, operations of Step S42 and the subsequent steps are repeated.

As described above, at the time of printing an image stored in a mobile phone, a CD, a DVD, a medium card, or the like using the print terminal 100, the user uploads image data of the image to the image storage server 200 in advance, and thus at the time of printing the uploaded image again, the user can print the image again simply by having image data including user identification information without requiring complicated operations.

Further, when a validity term is set as a time period for storing image data, a possibility that the image data leaks out of the image storage server 200 can be reduced.

Further, in the present invention, as compared to a related-art print terminal, a device such as a barcode reader is not required at the time of confirming user identification information, thereby being capable of reducing cost, and printing can be performed again without bringing a printed material and or the like that records identification information, and therefore convenience for users is enhanced.

The present invention has been described in detail, but the above description is in all aspects illustrative, and the present invention is not to be limited thereto. It is understood that unillustrated numerous modification examples are assumable without departing from the scope of the present invention.

Note that, in the present invention, the embodiment may be modified or omitted as appropriate within the scope of the invention.

The invention claimed is:

1. A printing service system comprising:
   a print terminal that prints input image data and outputs the input image data as a print image; and
   an image storage server that is connected to the print terminal via a public network, and that stores the image data sent from the print terminal via the public network and user identification information for identifying a user of the print terminal, wherein
   the print terminal acquires, out of the print image, photographing location information and photographing date/time information included as data in a user identification information image specified by the user, and creates the user identification information based on the acquired photographing location information and photographing date/time information,
   the image storage server associates the image data sent from the print terminal with the user identification information, and creates an image directory for each of the user to store the image data sent from the print terminal and the user identification information,
   in a case where the print terminal receives a re-input of image data of the user identification information image, the print terminal resends the user identification information to the image storage server,
   the image storage server receives resending of the user identification information, and in a case where an image directory including the resent user identification information internally exists, sends the image data in the image directory to the print terminal, and
   the print terminal changes security strength of the user identification information by changing precision of the photographing location information and changing a number of digits of the user identification information.

2. A printing service system comprising:
   a print terminal that prints input image data and outputs the input image data as a print image; and
   an image storage server that is connected to the print terminal via a public network, and that stores the image data sent from the print terminal via the public network and user identification information for identifying a user of the print terminal, wherein
   the print terminal acquires, out of the print image, photographing location information and photographing date/time information included as data in a user identification information image specified by the user, and creates the user identification information based on the acquired photographing location information and photographing date/time information,
   the image storage server associates the image data sent from the print terminal with the user identification information, and creates an image directory for each of the user to store the image data sent from the print terminal and the user identification information,
   in a case where the print terminal receives a re-input of image data of the user identification information image, the print terminal resends the user identification information to the image storage server,
   the image storage server receives resending of the user identification information, and in a case where an image directory including the resent user identification information internally exists, sends the image data in the image directory to the print terminal, and
   the print terminal changes security strength of the user identification information by changing precision of the photographing date/time information by changing a number of digits of the user identification information.

3. A print terminal that prints input image data and outputs the input image data as a print image, wherein
   out of the print image, photographing location information and photographing date/time information included as data in a user identification information image specified by a user are acquired, and user identification information for identifying the user of the print terminal is created based on the acquired the photographing location information and the photographing date/time information,
   the print terminal sends, to an image storage server connected via a public network, the image data and the user identification information through the public network, associates the image data with the user identification information to store the image data and the user identification information in the image storage server, resends the user identification information to the image storage server in a case where the print terminal receives a re-input of image data of the user identification information image, and makes the image storage server send the image data associated with the user identification information, and
   the print terminal changes security strength of the user identification information by changing precision of the photographing location or date/time information and changing a number of digits of the user identification information.

* * * * *